United States Patent
Mitchell et al.

(10) Patent No.: US 7,433,530 B2
(45) Date of Patent: Oct. 7, 2008

(54) SCALING OF MULTI-DIMENSIONAL DATA IN A HYBRID DOMAIN

(75) Inventors: Joan La Verne Mitchell, Longmont, CO (US); Timothy James Trenary, Bethoud, CO (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/981,305

(22) Filed: Nov. 3, 2004

(65) Prior Publication Data
US 2005/0094885 A1 May 5, 2005

Related U.S. Application Data

(62) Division of application No. 09/605,597, filed on Jun. 28, 2000, now Pat. No. 6,839,468.

(51) Int. Cl.
*G06K 9/46* (2006.01)
*G06K 9/32* (2006.01)

(52) U.S. Cl. .................... 382/250; 382/298

(58) Field of Classification Search ......... 382/232–253, 382/276–277, 298–300; 375/240.01–240.26; 708/400–405; 345/660, 667–671
See application file for complete search history.

(56) References Cited

U.S. PATENT DOCUMENTS

| | | | |
|---|---|---|---|
| 5,021,891 A | 6/1991 | Lee | |
| 5,168,375 A | 12/1992 | Reisch et al. | |
| 5,245,427 A | 9/1993 | Kunihiro | |
| 5,519,503 A * | 5/1996 | Ohki | 375/240.2 |
| 5,629,779 A | 5/1997 | Jeon | |
| 5,649,077 A | 7/1997 | On et al. | |
| 5,740,284 A * | 4/1998 | Wober et al. | 382/250 |
| 5,889,561 A * | 3/1999 | Kwok et al. | 375/240.3 |
| 6,002,809 A * | 12/1999 | Feog et al. | 382/250 |
| 6,067,384 A * | 5/2000 | Manickam et al. | 382/233 |
| 6,111,989 A * | 8/2000 | Chang et al. | 382/250 |
| 6,580,759 B1 * | 6/2003 | Peng | 375/240.25 |
| 6,621,866 B1 * | 9/2003 | Florencio et al. | 375/240.25 |
| 6,675,185 B1 * | 1/2004 | Mitchell et al. | 708/400 |
| 6,839,468 B1 * | 1/2005 | Mitchell et al. | 382/250 |
| 6,970,179 B1 * | 11/2005 | Trenary et al. | 345/671 |

OTHER PUBLICATIONS

U.S. Appl. No. 09/588,477, filed Jun. 7, 2000 entitled "Hybrid Domain Processing of Multi-Dimensional Transformed Data".
U.S. Appl. No. 09/570,382, filed May 12, 2000 entitled "Method and Apparatus for Scaling Up of Data".

* cited by examiner

*Primary Examiner*—Sherali Ishrat
(74) *Attorney, Agent, or Firm*—Rabindranath Dutta; Kondrad Raynes & Victor LLP

(57) ABSTRACT

A method for the scaling of data is provided. An exemplary use of the disclosed embodiments involves the scaling up in size or the scaling down in size of computer images. n-dimensional transformed data representing some original n-dimensional real data is received. An m-dimensional inverse transform on the n-dimensional transformed data is performed to produce hybrid data, where $1 \leq m < n$. The hybrid data is scaled in p dimensions to produce scaled hybrid data representing a desired p-dimensional change in the n-dimensional real data where $p \leq m$. Finally, an m-dimensional forward transform is performed on the scaled hybrid data to produce n-dimensional scaled transformed data.

2 Claims, 14 Drawing Sheets

STEP 1

2-D 8X8
DCT block

STEP 2

Perform 1-D IDCT's on
Eight Rows (Columns)

8 Hybrid Rows

STEP 3

Apply 1-D Real Domain
Scaling Algorithms To
Each Hybrid Row (Column)

Hybrid / Hybrid

STEP 4

Perform 1-D FDCT's On
Eight Rows (Columns) To
Get Two 2-D DCT Blocks
For Scaled Data

STEP 1

Two 2-D 8X8
DCT Blocks

STEP 2

Perform 1-D IDCT's on
Eight Rows (Columns)
for Each of the Two
DCT Blocks

8 Hybrid Rows

STEP 3

Apply 1-D Real Domain
Scaling Algorithms To
Each Hybrid Row (Column)

STEP 4

Perform 1-D FDCT's On
Eight Rows (Columns) To
Get One 2-D DCT Block
For Scaled Data

SCALING OF MULTI-DIMENSIONAL DATA IN A HYBRID DOMAIN

CROSS-REFERENCE TO RELATED APPLICATIONS

This application is a divisional of application Ser. No. 09/605,597 filed on Jun. 28, 2000, which is incorporated herein by reference in its entirety.

BACKGROUND OF THE INVENTION

1. Field of the Invention

This invention relates to a method and apparatus for efficiently scaling data which has been multi-dimensionally transformed from the real domain.

2. Description of the Related Art

Many types of data, such as radar data, oil well log data and digital image data, can consume a large amount of computer storage space. For example, computerized digital image files can require in excess of 1 MB. Therefore, several formats have been developed which manipulate the data in order to compress it. The discrete cosine transform (DCT) is a known technique for data compression and underlies a number of compression standards.

The mathematical function for a DCT in one dimension is:

$$\tilde{s}(k) = c(k) \sum_{n=0}^{N-1} s(n) \cos \frac{\pi(2n+1)k}{2N}, \quad (1)$$

where s is the array of N original values, $\tilde{s}$ is the array of N transformed values and the constants c are given by $$c(k) = \sqrt{\frac{1}{N}} \text{ for } k = 0; \quad c(k) = \sqrt{\frac{2}{N}} \text{ for } k > 0$$

Taking for example, the manipulation of image data, blocks of data consisting of 8 rows by 8 columns of data samples frequently are operated upon during image resizing processes. Therefore, a two-dimensional DCT calculation is necessary. The equation for a two-dimensional DCT where N=8 is:

$$\tilde{s}(i,j) = c(i,j) \sum_{n=0}^{7} \sum_{m=0}^{7} s(m,n) \cos \frac{\pi(2m+1)i}{16} \cos \frac{\pi(2n+1)j}{16}, \quad (2)$$

where s is an 8×8 matrix of 64 values; $\tilde{s}$ is an 8×8 matrix of 64 coefficients and the constants c(i,j) are given by $$c(i,j) = \frac{1}{8}, \text{ when } i=0 \text{ and } j=0; \quad c(i,j) = \frac{1}{4\sqrt{2}} \text{ if } i=0 \text{ and } j>0$$

$$\text{or } i>0 \text{ and } j=0; \quad c(i,j) = \frac{1}{4} \text{ when } i,j>0$$

Because data is taken from the "real" or spatial image domain and transformed into the DCT domain by equations (1) and (2), these DCT operations are referred to as forward Discrete Cosine Transforms (FDCT), or forward transforms.

As previously mentioned, the DCT can be used as an image compression technique which underlies a number of compression standards. These include the well-known Joint Photographic Experts Group (JPEG) and the Moving Picture Experts Group (MPEG) standards. Comprehensive references on the JPEG and MPEG standards include *JPEG Still Image Data Compression Standard* by William B. Pennebaker and Joan L. Mitchell (©1993 Van Nostrand Reinhold), and *MPEG Video Compression Standard* by Joan L. Mitchell, William B. Pennebaker, et al (©1997 Chapman & Hall).

Looking at the JPEG method, for example, there are five basic steps. Again taking the example of the manipulation of image data, the first step is to extract an 8×8 pixel block from the image. The second step is to calculate the FDCT for each block. Third, a quantizer rounds off the DCT coefficients according to the specified image quality. Fourth, the quantized, two-dimensional 8×8 block of DCT coefficients are reordered into a one-dimensional vector according to a zig zag scan order. Fifth, the coefficients are compressed using an entropy encoding scheme such as Huffman coding or arithmetic coding. The final compressed data is then written to the output file.

Returning to the first step, source image samples are grouped into 8×8 data matrices, or blocks. The initial image data is frequently converted from normal RGB color space to a luminance/chrominance color space, such as YUV. YUV is a color space scheme that stores information about an image's luminance (brightness) and chrominance (hue). Because the human eye is more sensitive to luminance than chrominance, more information about an image's chrominance can be discarded as compared to luminance data.

Once an 8×8 data block has been extracted from the original image and is in the desired color scheme, the DCT coefficients are computed. The 8×8 matrix is entered into the DCT algorithm, and transformed into 64 unique, two-dimensional spatial frequencies thereby determining the input block's spectrum.

The ultimate goal of this FDCT step is to represent the image data in a different domain using the cosine functions. This can be advantageous because it is a characteristic of cosine functions that most of the spatial frequencies will disappear for images in which the image data changes slightly as a function of space. The image blocks are transformed into numerous curves of different frequencies. Later, when these curves are put back together through an inverse step, a close approximation to the original block is restored.

After the FDCT step, the 8×8 matrix contains "transformed data" (i.e., data which is in the DCT domain) comprised of 64 DCT coefficients in which the first coefficient, commonly referred to as the DC coefficient, is related to the average of the original 64 values in the block. The other coefficients are commonly referred to as AC coefficients.

Up to this point in the JPEG compression process, little actual image compression has occurred. The 8×8 pixel block has simply been converted into an 8×8 matrix of DCT coefficients. The third step involves preparing the matrix for further compression by quantizing each element in the matrix. The JPEG standard gives two exemplary tables of quantization constants, one for luminance and one for chrominance. These constants were derived from experiments on the human visual system. The 64 values used in the quantization matrix are stored in the JPEG compressed data as part of the header, making dequantization of the coefficients possible. The encoder needs to use the same constants to quantize the DCT coefficients.

Each DCT coefficient is divided by its corresponding constant in the quantization table and rounded off to the nearest integer. The result of quantizing the DCT coefficients is that smaller, unimportant coefficients will disappear and larger coefficients will lose unnecessary precision. As a result of this quantization step, some of the original image quality is lost. However, the actual image data lost is often not visible to the human eye at normal magnification.

Quantizing produces a list of streamlined DCT coefficients that can now be very efficiently compressed using either a Huffman or arithmetic encoding scheme. Thus the final step in the JPEG compression algorithm is to encode the data using an entropy encoding scheme. Before the matrix is encoded, it is arranged in a one-dimensional vector in a zigzag order. The coefficients representing low frequencies are moved to the beginning of the vector and the coefficients representing higher frequencies are placed toward the end of the vector. By placing the higher frequencies (which are more likely to be zeros) at the end of the vector, an end of block code can be used to truncate the larger sequence of zeros which permits better overall compression.

Equations (1) and (2) describe the process for performing a FDCT, i.e., taking the data from the real domain into the DCT domain. When it is necessary to reverse this step, i.e., transform the data from the DCT domain to the real domain, a DCT operation known as an Inverse Discrete Cosine Transform (IDCT), or an inverse transform, can be performed. For a one-dimensional, inverse transform, the IDCT is defined as follows:

$$s(n) = \sum_{k=0}^{N-1} c(k)\tilde{s}(k)\cos\frac{\pi(2n+1)k}{2N}, \quad (3)$$

where s is the array of N original values, $\tilde{s}$ is the array of N transformed values and the constants c are given by $$c(k) = \sqrt{\frac{1}{N}} \text{ for } k = 0; c(k) = \sqrt{\frac{2}{N}} \text{ for } k > 0$$

For an inverse transform in two dimensions where N=8, the IDCT is defined:

$$s(m,n) = \sum_{i=0}^{7}\sum_{j=0}^{7} c(i,j)\tilde{s}(i,j)\cos\frac{\pi(2m+1)i}{16}\cos\frac{\pi(2n+1)j}{16}, \quad (4)$$

where s is an 8×8 matrix of 64 values, $\tilde{s}$ is an 8×8 matrix of 64 coefficients and the constants c(i,j) are given by $$c(i,j) = \frac{1}{8} \text{ when } i = 0 \text{ and } j = 0; c(i,j) = \frac{1}{4\sqrt{2}} \text{ if } i = 0 \text{ and } j > 0$$

$$\text{or } i > 0 \text{ and } j = 0; c(i,j) = \frac{1}{4} \text{ when } i, j > 0$$

As previously stated, digital images are often transmitted and stored in compressed data formats, such as the previously described JPEG standard. In this context, there often arises the need to scale (i.e., enlarge or reduce) the dimensions of an image that is provided in a compressed data format in order to achieve a suitable image size.

For example, where an image is to be sent in compressed data format to receivers of different computational and output capabilities, it may be necessary to scale the size of the image to match the capabilities of each receiver. For example, some printers are designed to receive images which are of a certain size, but the printers must have the capability of scaling up or scaling down the image size for printing purposes, particularly when the original image was intended for low resolution display output or higher resolution output, as the case may be.

A known method for scaling up an image provided in a transformed data format is illustrated in FIG. 1a. First, a determination is made as to the amount of desired image enlargement B. (Block 101) Next, one 8×8 block of transformed data is retrieved and an IDCT is performed on all 64 coefficients in the block to transform the data into the real or spatial domain. (Blocks 102 & 103)

Once in the real domain, additional real domain pixel or pel values are created by known methods, such as interpolation. (Block 104) This results in the creation of B adjacent data blocks of 64 pixel or pel values per block in each dimension. If, for example, a scale up factor of two (2) was desired, then this step would result in the creation of 2 data blocks in each dimension for a total of four (4) blocks. Then a FDCT operation is performed on the data of the four adjacent 8×8 blocks to return the data to the DCT domain. (Block 105) The process is repeated for all remaining data in the input image. (Block 106)

Thus given a portion of an image in a JPEG/DCT compressed data format consisting of one compressed 8×8 block of image data, scaling up the image by a factor of two in each dimension using a previously known method requires: (1) entropy decoding the data which is in one-dimensional vector format and placing the data in 8×8 blocks, (2) de-quantizing the data; (3) performing 8×8 IDCT operations to inverse transform the transformed blocks of image data; (4) additional interpolation or related operations to scale up the blocks of image data (in the real domain) into four 8×8 blocks of scaled image data; (5) four 8×8 FDCT operations to re-transform the four blocks of scaled image data; (6) quantizing the four 8×8 blocks of data; and (7) placing the four blocks of data in one-dimensional vectors and entropy encoding the data for storage or transmission. Given the mathematical complexity of the FDCT and IDCT operations, such a large number of operations can be computationally time consuming.

A known method for scaling down an image provided in a compressed data format is illustrated in FIG. 1b. First, a determination is made as to the amount of desired image reduction 1/B. (Block 110) If, for example, an image reduction by ⅓ is desired, then 3 adjacent 8×8 blocks of transformed data values (for a total of 64×3 or 192 values) are retrieved from the image. (Block 111) An IDCT is performed on each of the three blocks to transform the pixel or pel data into the real or spatial domain. (Block 112) Once in the real domain, the data is reduced from 3 adjacent 8×8 data blocks into a single 8×8 data block by any one of several, known filtering techniques. (Block 113) Then a FDCT operation is performed on the data of the single 8×8 data block to return the data to the DCT domain. (Block 114) The process is repeated for all remaining data in the input image. (Block 115)

Thus given a portion of an image in a JPEG/DCT compressed data format consisting of four compressed 8×8 blocks of image data, scaling down the image by a factor of two in each dimension using a previously known method requires: (1) entropy decoding the data which is in one-dimensional vector format and placing the data in 8×8 blocks; (2) dequantizing the data; (3) performing four 8×8 IDCT operations to inverse transform the transformed blocks of image data; (4) 5 additional filtering operations to scale down the blocks of image data (in the real domain) into one 8×8 block of scaled image data; (5) an 8×8 FDCT operation to re-transform the block of scaled image data; (6) quantizing the 8×8 block of data; and (7) placing the block of data in one-dimensional vectors and entropy encoding the data for storage or transmission. As was the case with scaling up an image, the mathematical complexity of the FDCT and IDCT operations used in scaling down an image can involve a large number of operations which are computationally time consuming.

What is needed is an efficient method and apparatus that operates directly on multi-dimensional transformed data to convert it into transformed scaled (i.e. scaled up or scaled down) data.

SUMMARY OF THE PREFERRED EMBODIMENTS

To overcome the limitations in the prior art described above, preferred embodiments disclose a method, system, and article of manufacture for the scaling of multi-dimensionally transformed data. An exemplary use of the disclosed embodiments involves the scaling up in size or the scaling down in size of computer images.

In one embodiment, n-dimensional transformed data representing some original n-dimensional real data is received. An m-dimensional inverse transform is performed on the n-dimensional transformed data to produce hybrid data, where $1 \leq m < n$. Finally, the hybrid data is scaled in p dimensions to produce scaled hybrid data representing a desired p-dimensional change in the n-dimensional real data where $p \leq m$.

In an alternative embodiment, the previously described steps are followed by the step of performing an m-dimensional forward transform on the scaled hybrid data to produce n-dimensional scaled transformed data.

In yet another embodiment, an (n−m) dimensional inverse transform is performed on the scaled hybrid data to produce n-dimensional scaled real data.

In still another embodiment, the n-dimensional transformed data comprises quantized data. The n-dimensional transformed data is dequantized. Later, the n-dimensional scaled transformed data is requantized.

In yet another embodiment, the step of requantizing the n-dimensional scaled transformed data yields non-integer values.

In still another embodiment, the non-integer values are comprised of a first set of values individually having an absolute value greater than or equal to a pre-determined value and a second set of values individually having an absolute value less than the pre-determined value, the method further comprising setting each value of the second set of values to a value of zero.

In yet another embodiment, n-dimensional real data is received. An (n−m)-dimensional forward transform is performed on the n-dimensional real data to produce hybrid data, where $1 \leq m < n$. The hybrid data is scaled in p dimensions to produce scaled hybrid data representing a desired p-dimensional change in the n-dimensional real data where $p \leq m$.

In still another embodiment, an m-dimensional forward transform is performed on the scaled hybrid data to generate n-dimensional transformed data.

DETAILED DESCRIPTION OF THE PREFERRED EMBODIMENTS

In the following description, reference is made to the accompanying drawings which form a part hereof and which illustrate several embodiments of the present invention. It is understood that other embodiments may be used and structural and operational changes may be made without departing from the scope of the present invention.

For purposes of illustrating the invention, the well-known JPEG and MPEG DCT transform operation of image data is being used. However, the same techniques can be used to scale any multi-dimensional array of multi-dimensionally transformed data as long as the transform used is separable. DCT transform operations work best when the data contains some internal correlation that the FDCT can then de-correlate.

Computing Environment

Figure 1A:
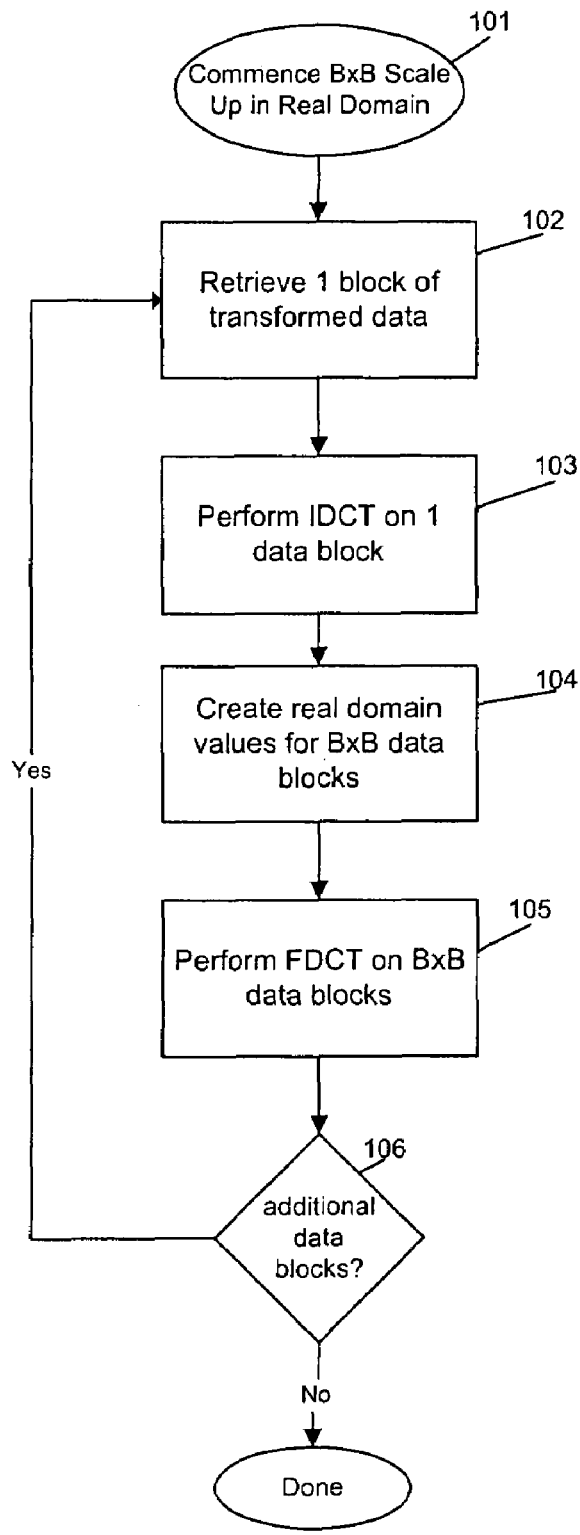
FIG. 1a illustrates the logic for a known method of scaling up the size of an input image which is received in transformed format.
Figure 1B:
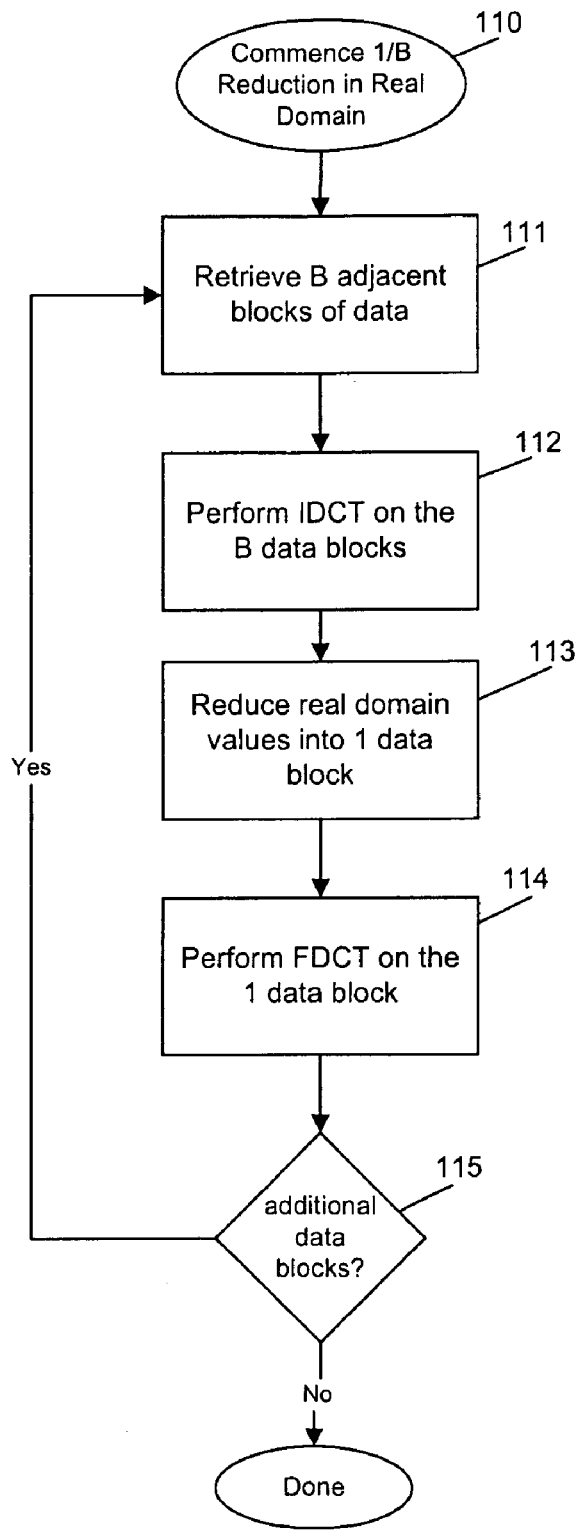
FIG. 1b illustrates the logic for a known method of scaling down the size of an input image which is received in transformed format.
Figure 2:
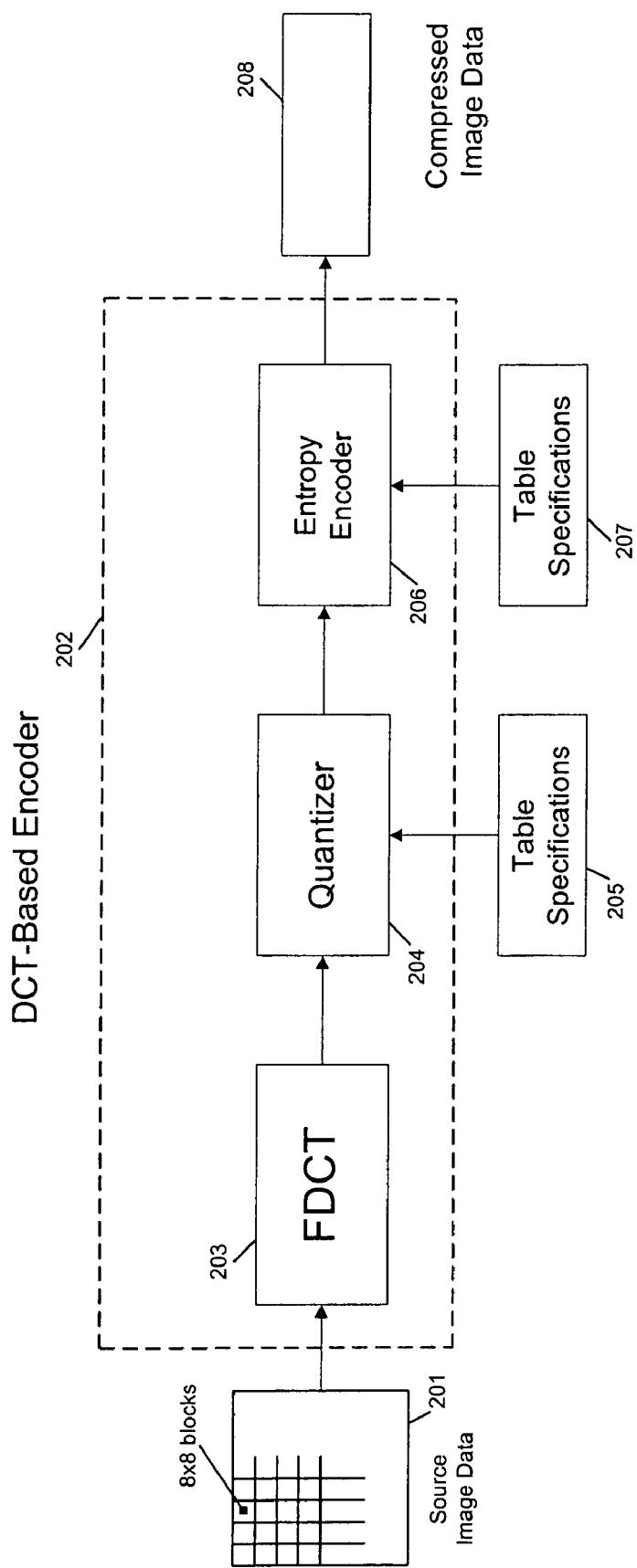
FIG. 2 is a simplified block diagram of a DCT-based JPEG encoder.

Referring now to the drawings, and more particularly to FIG. 2, there is shown a simplified block diagram of a DCT-based encoder. A source image sampled data 201 in 8×8 blocks are input to the encoder 202. Each 8×8 data block is transformed by the Forward Discrete Cosine Transform (FDCT) 203 into a set of 64 values, referred to as DCT coefficients or transformed data samples. One of these values is referred to as the DC coefficient, and the other 63 values are referred to as AC coefficients. Each of the 64 transformed data samples are then quantized by quantizer 204 using one of 64 corresponding input quantization values from a quantization table 205. The quantized transformed data samples are then passed to an entropy encoding procedure 206 using table specifications 207. This procedure compresses the data further. One of two entropy encoding procedures can be used, Huffman encoding or arithmetic encoding. If Huffman encoding is used, the Huffman table specifications must be provided, but if arithmetic encoding is used, then arithmetic coding conditioning table specifications must be provided. The previous quantized DC coefficient is used to predict the current DC coefficient and the difference is encoded. The 63 AC coefficients, however, are not differentially encoded but, rather, are converted into a zig-zag sequence. The output of the entropy encoder is the compressed image data 208.

Figure 3:
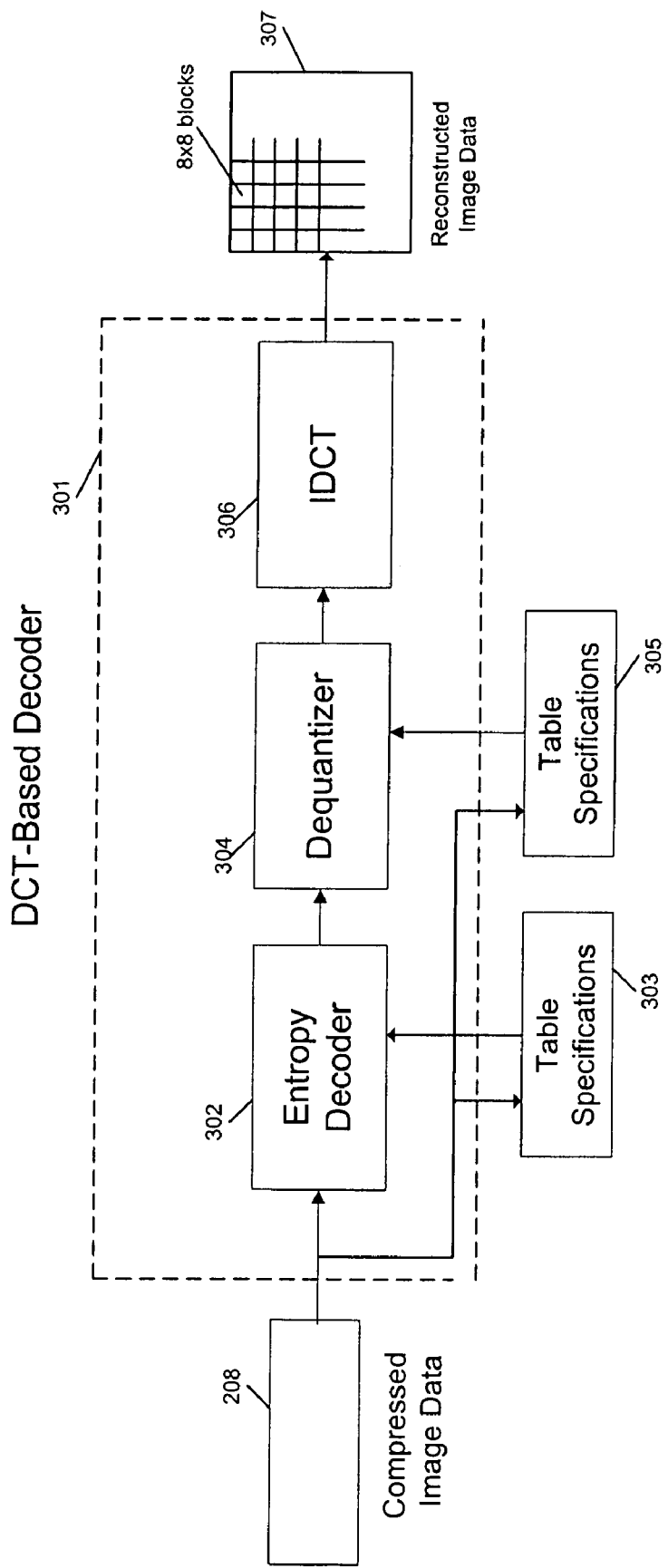
FIG. 3 is a simplified block diagram of a DCT-based JPEG decoder.

FIG. 3 shows a simplified block diagram of the DCT-based decoder. Each step shown performs essentially the inverse of its corresponding procedure within the encoder shown in FIG. 2. The compressed image data 208 is input to the decoder 301 where it is first processed by an entropy decoder procedure 302 which decodes the zig-zag sequence of the quantized DCT coefficients. This is done using either Huffman table specifications or arithmetic coding conditioning table specifications 303, depending on the coding used in the encoder. The quantized DCT coefficients (or quantized transformed data samples) output from the entropy decoder are input to the dequantizer 304 which, using quantization table specifications 305 comprising output quantization values, outputs dequantized DCT coefficients to Inverse Discrete Cosine Transform (IDCT) 306. The output of the IDCT 306 is the reconstructed image 307.

Figure 4:
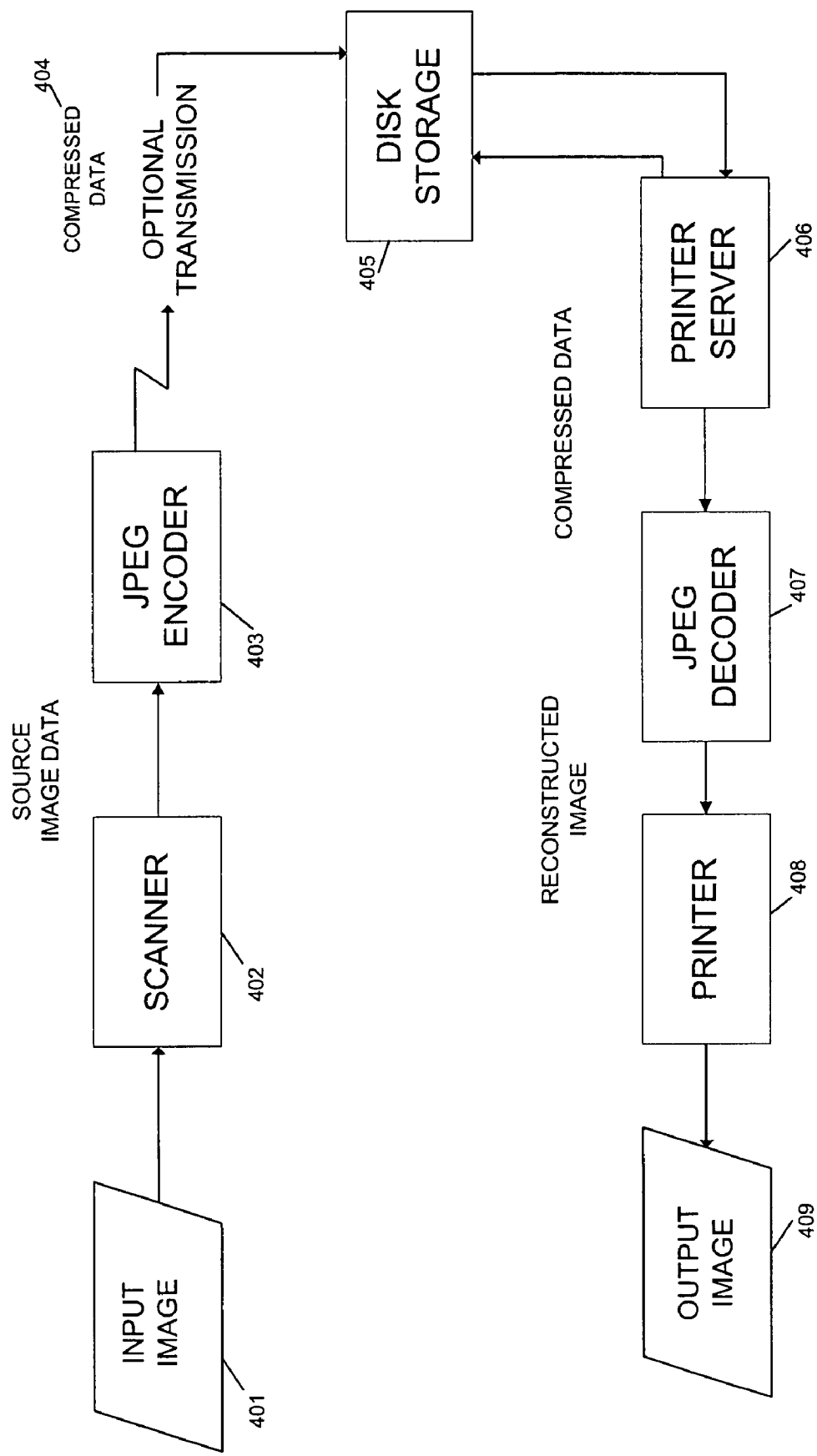
FIG. 4 is a block diagram of a simple printing system that uses JPEG compressed images in accordance with one embodiment of the present invention.

FIG. 4 is a block diagram of a simple printing system that uses JPEG compressed images and scales the image data in accordance with one embodiment of the present invention. For this illustration, the input image is assumed to be a grayscale image comprised of samples from only one component and the printer, a grayscale printer. The input image 401 is scanned in the scanner 402 and then the source image data, a single component of gray, is compressed with a JPEG encoder 403, such as described with reference to FIG. 2. The JPEG encoder 403 is shown separately from the scanner 402, but in a practical embodiment, the JPEG encoder 403 could be incorporated with the scanner 402. The output of the JPEG encoder 403 is compressed data 404. After optional transmission, the compressed data is stored on a disk storage device 405. At some later time, the compressed data stored on the disk storage device 405 is retrieved by the printer server 406 which scales the image in the hybrid domain. (This scaling of data in the hybrid domain will be described in more detail below.) The scaled image is recompressed in the printer server 406 so that the JPEG decoder 407 decodes the reconstructed scaled image. The JPEG decoder 407 is as described with reference to FIG. 3. The JPEG decoder 407 is shown separately from the printer 408, but in a practical embodiment, the JPEG decoder 407 could be incorporated with the printer 408. The printer 408 prints the grayscale scaled image and produces the output image 409 on paper.

Scaling of Image Size

The preferred embodiments of the present invention include a method, system and article of manufacture for efficiently scaling data which is received as transformed (e.g. DCT-based) data. A DCT-domain scaling method is disclosed that scales incoming data along one or more dimensions into scaled output data by a given scaling factor for the entire set of data.

Figure 5:
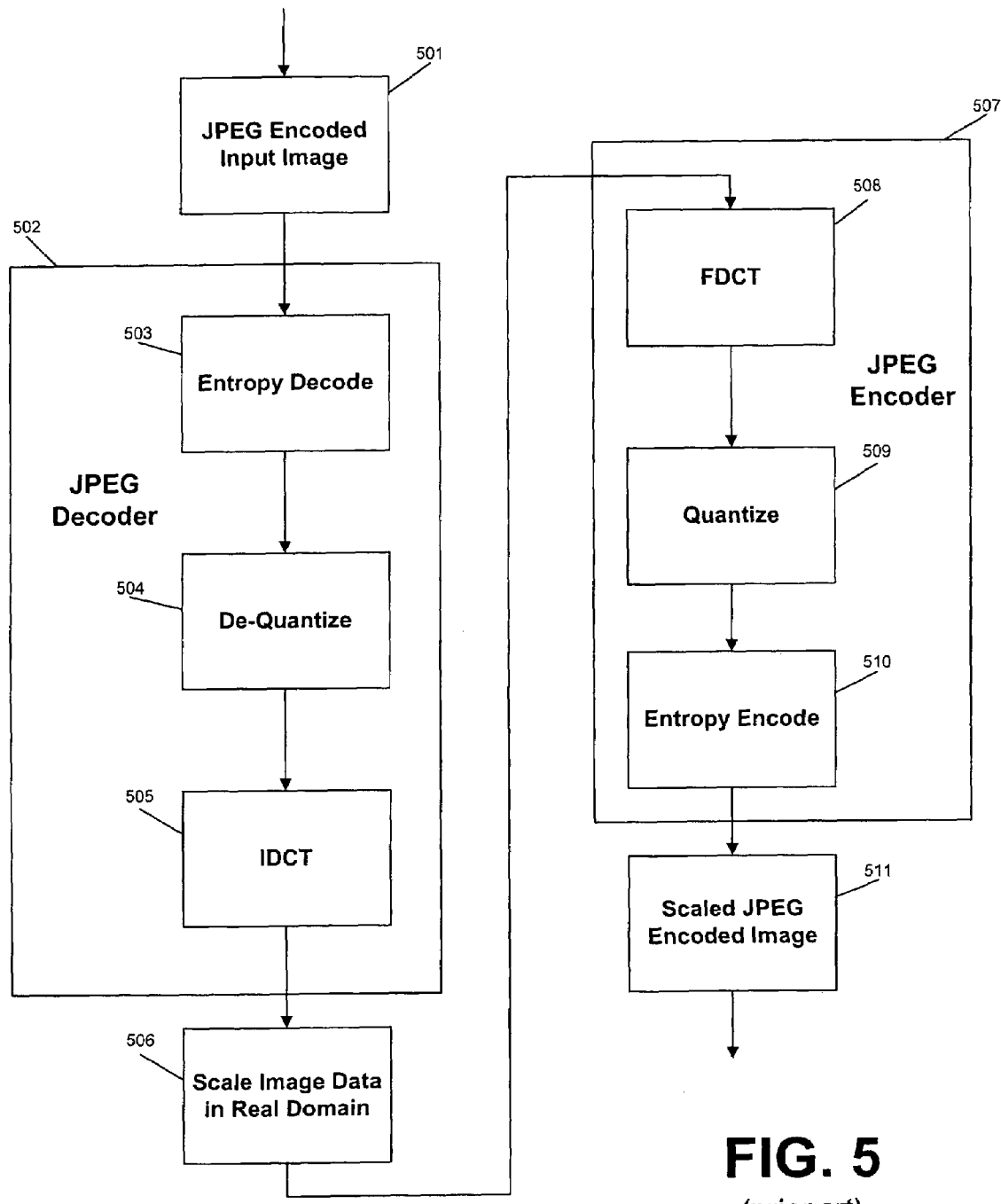
FIG. 5 is a simplified block diagram showing a known method of scaling the size of a JPEG encoded input image.

FIG. 5 shows a known, traditional method for the scaling of images. The compressed image 501 is JPEG decoded by JPEG decoder 502. The decoder 502 first entropy decodes 503 the data which arrives in one-dimensional vector format and places the data in two-dimensional block format. Next the data is taken through a de-quantizing step 504. Finally, an IDCT operation 505 is performed to inverse transform the transformed blocks of image data to the real domain.

When in the real domain, the image data is scaled 506 by interpolation or filtering operations.

The scaled data is sent to the JPEG encoder 507 where the process is reversed. First, FDCT operations 508 are performed to re-transform blocks of scaled image data from the real domain to the DCT domain. The transformed data is then quantized 509, placed in a one-dimensional vector and entropy encoded 510 for storage or transmission as a JPEG encoded image of scaled dimensions 511. Thus it is seen that the known, scaling method of FIG. 5 involves the performing of scaling operations on data which is in the real domain.

Figure 6:
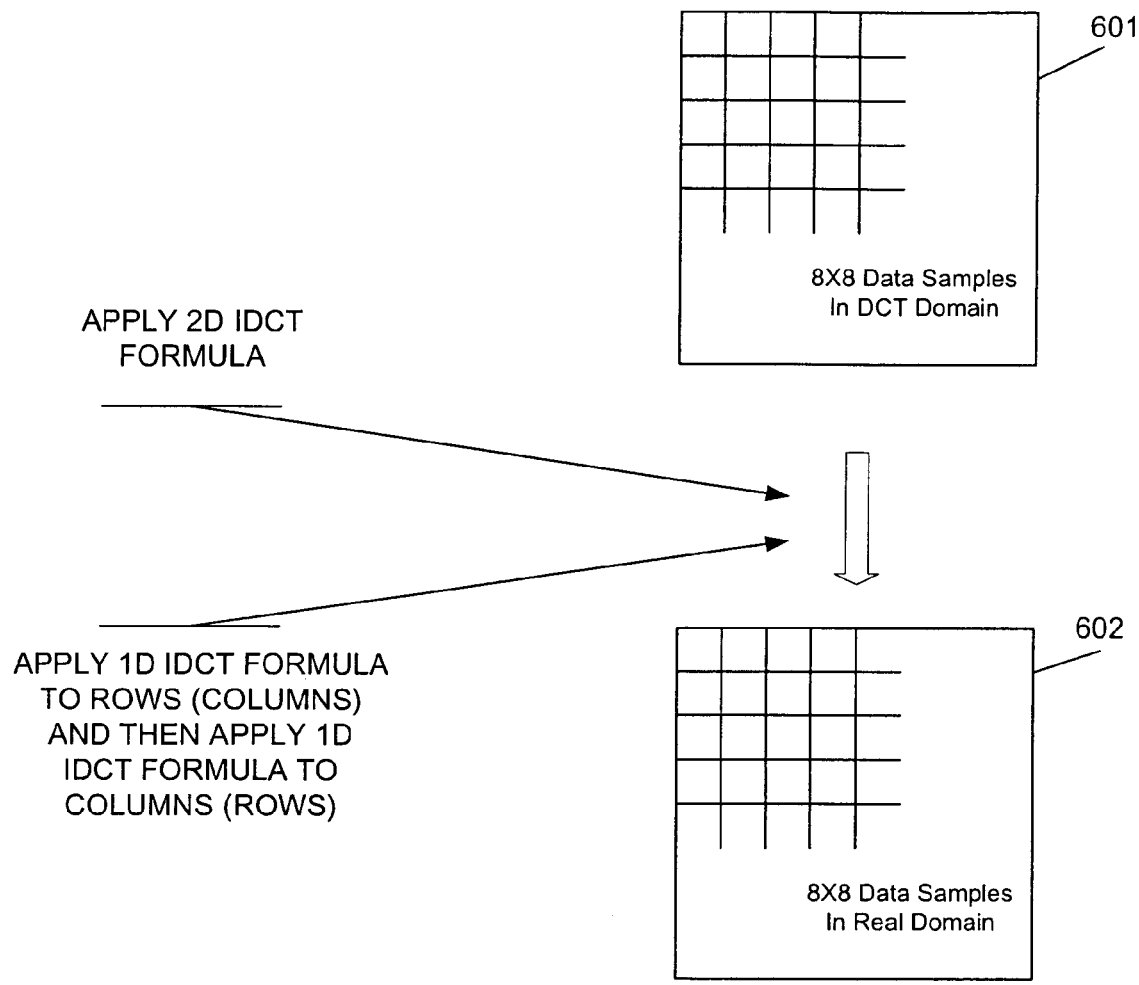
FIG. 6 is a block diagram showing equivalent methods for performing a two dimensional Inverse Discrete Cosine Transform.

In the case of a two-dimensional input block of data, step 505 of FIG. 5 involves performing an inverse transform on that two-dimensional transformed data block and outputting the corresponding two-dimensional data in the real domain for later data manipulation, such as scaling. Referring to FIG. 6, this known step was accomplished in one of two ways. The input DCT data 60 could be inverse transformed using the two-dimensional inverse transform formula of equation (4) to produce a two-dimensional data block in the real domain 602. Alternatively, the input DCT data could be inverse transformed using the one-dimensional inverse transform formula of equation (3) on all rows of data in the input data block 601 and then the same equation applied to all columns of data. Alternatively, the inverse transform of equation (3) could be made first to all columns of data, followed by all rows of data. In either event, this also would produce an output block of two-dimensional data in the real domain 602.

Similarly, the FDCT step 508 of FIG. 5 could be accomplished in either one of two ways, i.e., forward transformed using the two-dimensional forward transform formula of equation (2) or forward transformed using the one-dimensional forward transform formula of equation (1) on all rows of data in the input data block and then on all columns of data.

As previously stated, a disadvantage of the known scaling method of FIG. 5 is its time-consuming, computational complexity. One approach to speeding up the scaling of DCT domain data involves the calculation in advance of values which can be stored in transformation matrices and applied directly to the incoming DCT coefficients. Such an approach is discussed in more detail in pending application Ser. No. 09/570,382, filed May 12, 2000, by Timothy J. Trenary, Joan L. Mitchell, Ian R. Finlay, and Nenad Rijavec, for "Method and Apparatus For The Scaling Up of Data" (IBM Docket BLD9-99-0041) and assigned to a common assignee with this application.

There are limitations however to a strictly transform-based approach to the scaling of data. First, such an approach is restricted by nature to manipulation of full blocks of data. For example, when working in the domain of two-dimensional DCT transforms such as those used in JPEG images, scaling can only be achieved for factors of m/n where m and n are positive integers. Furthermore, the input (pre-scaled) and output (scaled) data must be an integer number of 8×8 blocks. For example when scaling down by a factor of 4 in one dimension, one must have 4 contiguous blocks of input data so that one scaled data block can be produced Another limitation is that offering a variety of scaling factors in a data-transform suite requires pre-computing and storing transformation matrices for each up-scaling factor and each down-scaling factor. Considering that transform based scaling by a factor of m (either up or down) requires m distinct tables and that one may want to include different types of scaling algorithms (i.e. replication, interpolation, spline fits) for each factor, an excessive number of tables could be required for a given scaling factor assortment.

The large number of required tables can lead to another possible limitation—overly-complex code. Since each table consists of floating point values which must be pre computed, the opportunity to introduce erroneous transformations is great when compared to the present invention which requires essentially one algorithm to achieve arbitrary scaling (of a particular type). The debugging process for a transform based scaling routine could require the examination and re computation of many of the tables of constants.

Figure 7:
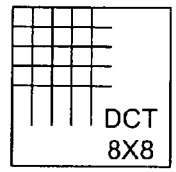
FIG. 7 is a simplified process diagram showing the scaling up of DCT transformed data according to an embodiment of the present invention.
Figure 7:
Figure 7:
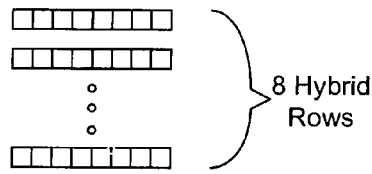
Figure 7:
Figure 7:
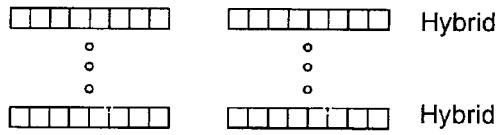
Figure 7:
Figure 7:
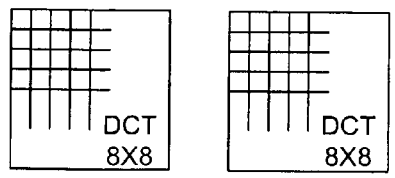

FIG. 7 shows the application of one embodiment of the present invention resulting in a faster scaling of data. For illustration purposes, the example in FIG. 7 involves the scaling up of a two-dimensional array of data by a factor of two in only one dimension—in this case, the horizontal dimension. In step 1, a single, two-dimensional block of transformed data (i.e., data which is in the DCT domain) is received. In this example, the block is an 8×8 matrix of data. In step 2, a one-dimensional inverse transform (i.e., an IDCT operation) is performed on each of the rows of transformed data, using equation (3). Thus in this example, inverse transforms are performed on eight rows of data. On the other hand, if the scaling of FIG. 7 were being applied in the vertical dimension, then the inverse transforms would be performed on columns of data, rather than on the rows.

Once the inverse transform is completed in one dimension, the data is neither in a state of being in the DCT domain, nor is it in a state of being in the real domain. In order for the data from the input block of step 1 to be transformed into the real domain, inverse transforms would need to be performed on all of the data in both the rows and the columns, i.e., in both dimensions. Alternatively, the two-dimensional inverse transform of equation (4) would need to be applied to the two-dimensional, 8×8 data block.

Because the data of step 2 of FIG. 7 is in neither the DCT domain nor in the real domain, this data will be referred to as "hybrid" data, or data in the "hybrid" domain, for the purposes of this patent application.

In step 3, the hybrid data is scaled up, using any one of several known scaling up algorithms, to produce two sets of hybrid data representing two sets of eight rows of "real data" (i.e., data which is in the real domain). For example, a linear interpolation scaling method can be used wherein the average of two, known samples is inserted between those samples. Alternatively, a replication method can be used wherein a single pel value is repeated a certain number of times to achieve a desired number of output samples.

Returning to FIG. 7, once the rows of hybrid data are scaled up, one-dimensional forward transforms are performed on each of the 8 rows in each of the two sets of hybrid data, using equation (1). (Step 4) This returns the hybrid data to transformed data (i.e., data which is in the DCT domain) thus generating two 2-dimensional DCT blocks of data which have been scaled in the horizontal dimension.

This invention is not restricted to scaling which preserves block boundaries (that is, scaling which takes an integer number of complete data blocks and outputs an integer number of complete data blocks). The present invention allows for the scaling of a given number of samples to any other desired number of samples by all traditional real-domain techniques, e.g., insertion of single samples by interpolation. (i.e., inserting between two original samples, their average) In addition, shift, crop and/or merge operations can simultaneously be incorporated into the scaling process by simply selecting the appropriate hybrid domain samples as input to the forward transform.

Figure 8:
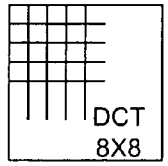
FIG. 8 is a simplified process diagram showing the scaling down of DCT transformed data according to an embodiment of the present invention.
Figure 8:
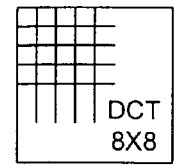
Figure 8:
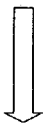
Figure 8:
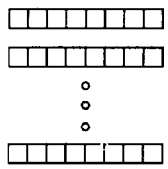
Figure 8:
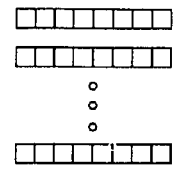
Figure 8:
Figure 8:
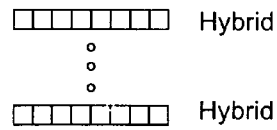
Figure 8:
Figure 8:
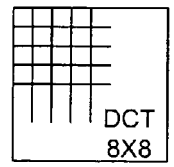

While the example in FIG. 7 illustrates the scaling up of data, it will be appreciated by those skilled in the art that the inventive methods apply equally well to the scaling down of data. FIG. 8 shows one example of the scaling down of data using one embodiment of the present invention wherein the scaling down of a two-dimensional array of data by a factor of two in one dimension—in this case, the horizontal dimension—is accomplished. In step 1, two (2) two-dimensional blocks of transformed data (i.e., data which is in the DCT domain) are received. In step 2, an inverse transform is performed on each of the rows of transformed data, using equation (3). Thus in this example, inverse transforms are performed on eight rows of data per block to produce a total of 16 "hybrid" rows.

In step 3, the hybrid data is scaled down, using any one of several known scaling down algorithms, to produce one set of hybrid data representing one set of eight rows of real data. Known scaling down algorithms include the low pass filtering methods, deletion of selected samples, etc.

Still referring to FIG. 8, once the rows of hybrid data are scaled down, one-dimensional forward transforms are performed on each of the 8 rows of scaled, hybrid data, using equation (1). (Step 4) This returns the hybrid data to transformed data (i.e., data which is in the DCT domain) thus generating one 2-dimensional DCT data block for data which has been scaled in the horizontal dimension.

Again, note that the previous example was restricted to scaling which preserves block boundaries (that is, scaling which takes an integer number of complete data blocks and outputs an integer number of complete data blocks) for illustrative purposes only. The present invention however allows for arbitrary scaling by all traditional real-domain techniques which simultaneously allows for the incorporation of shift, crop and/or merge operations into the scaling process by simply selecting the appropriate hybrid domain samples as input to the forward transform.

The inventive methods of FIGS. 7 and 8 can achieve a significantly faster scaling of data over the traditional, known methods such as that shown in FIG. 5 which involve transforming data to and from the real domain in both dimensions. The computations involved in transforming data to and from a hybrid domain using one-dimensional calculations can be substantially less. Moreover, the computational complexity can be further reduced by using any of the fast DCT methods which are known to those skilled in the art. One such algorithm is explained below.

Figure 9A:
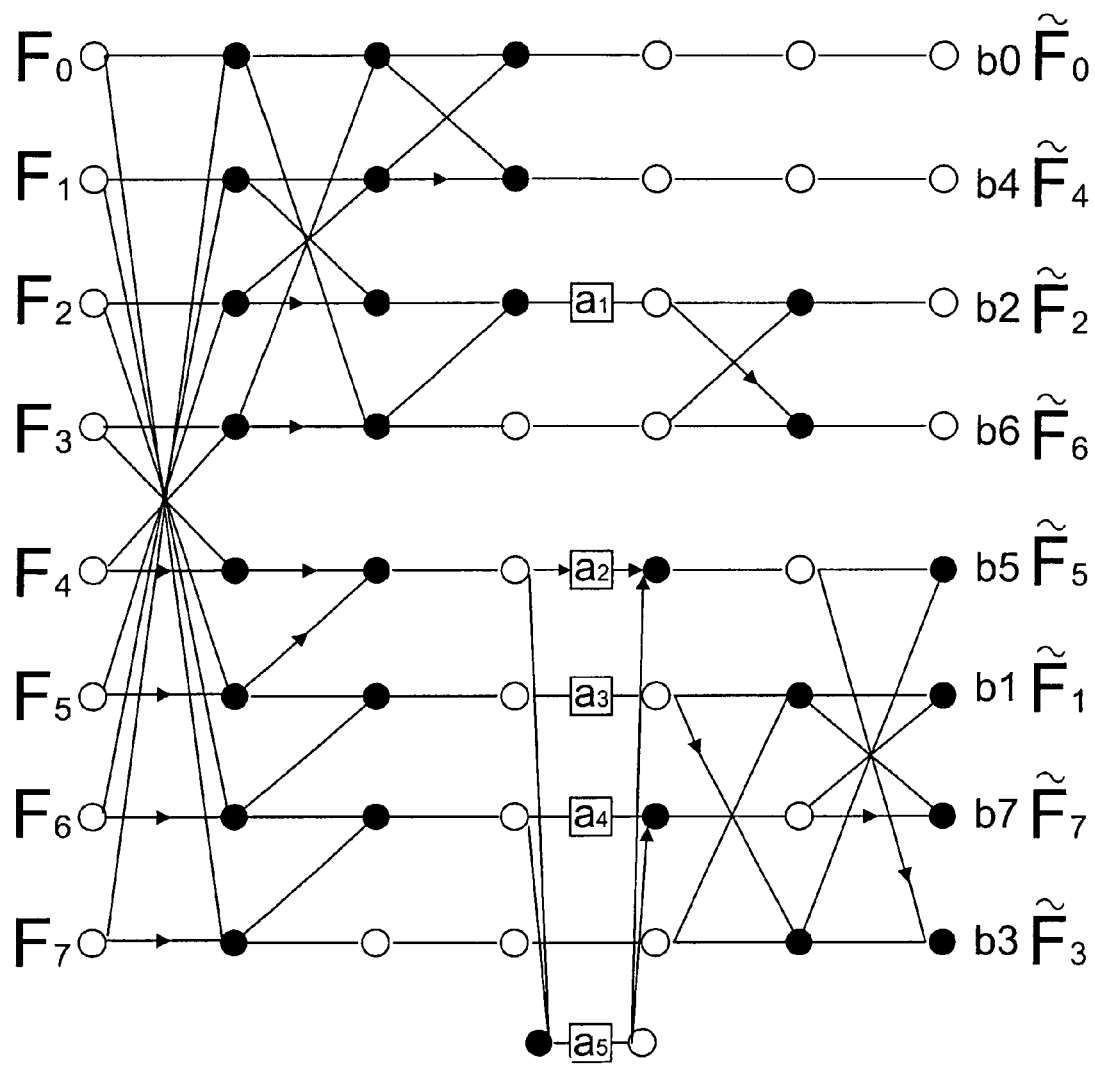
FIG. 9a is a flow graph for a known, fast Forward Discrete Cosine Transform.
Figure 9B:
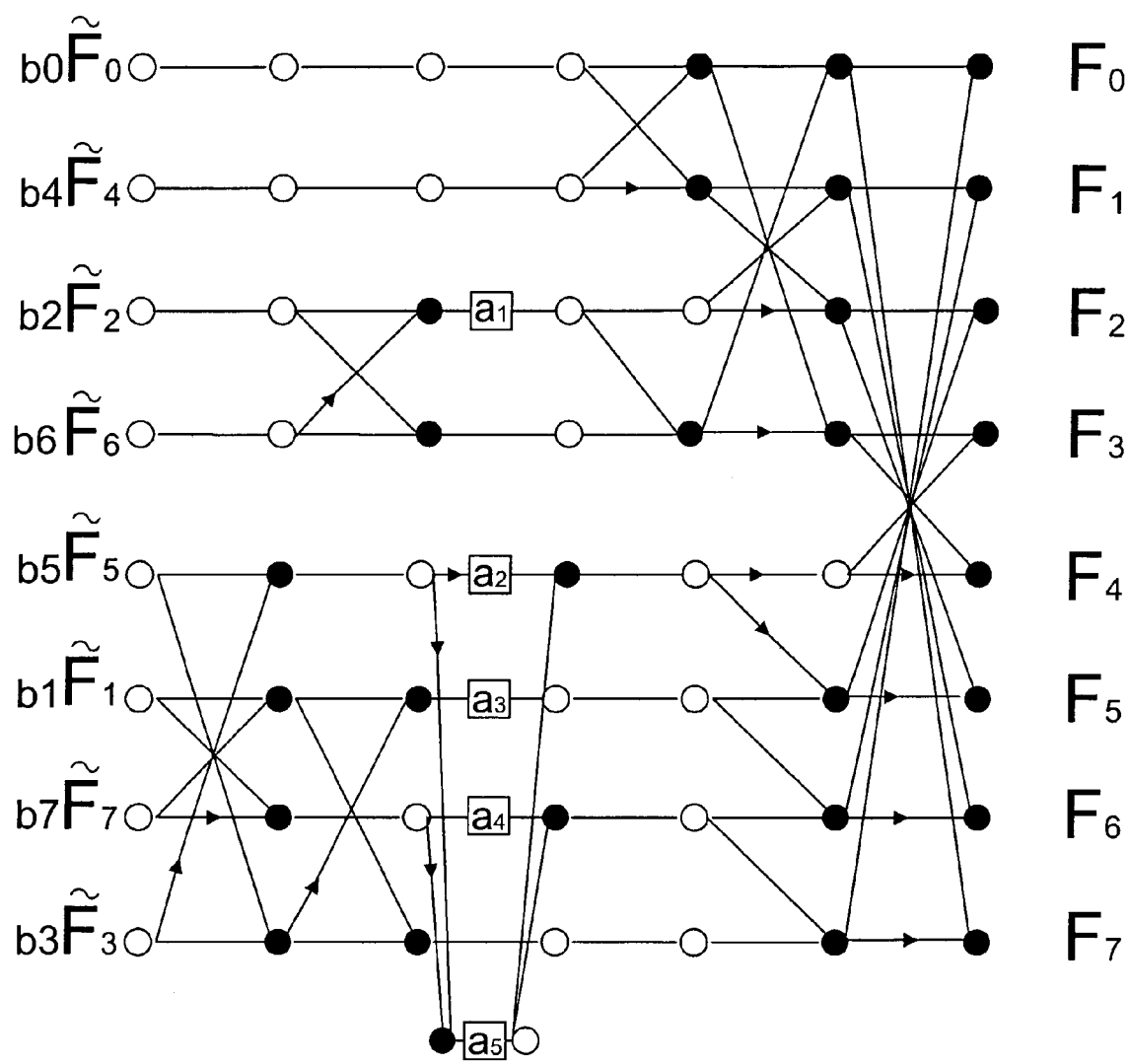
FIG. 9b is a flow graph for a known, fast Inverse Discrete Cosine Transform.

FIGS. 9a and 9b show flow graphs for a known, one-dimensional (1-D) fast Forward Discrete Cosine Transform, (See W. B. Pennebaker and J. L. Mitchell, *JPEG Still Image Data Compression Standard*, Van Nostrand Reinhold (1993), Chapter 4 "The Discrete Cosine Transform (DCT)", FIG. 4-8 ) and a known one-dimensional (1-D) fast Inverse Discrete Cosine Transform, respectively. A fast DCT is a sequence of operations that efficiently computes the set of weighted sums and differences making up the DCT coefficients.

The algorithm implemented by the flow graph of FIG. 9a derives the DCT coefficients by a simple scaling of the real part of the Discrete Fourier Transform (DFT) coefficients. In this flow graph, the flow is from left to right, and signals or values are summed where their lines merge at a node indicated by a solid circle. If a line has an arrow head, then the value is negated or inverted before the addition to (i.e., subtracted from) the other value fed to the node.

For example referring to FIG. 9a, considering the first solid circle node in the top line of the flow graph (signal line $F_0$), the input values are $F_0$ and $F_7$ and the output is $F_0+F_7$. However, in the first solid circle node of the bottom line of the flow graph (signal line $F_7$), the input values are again $F_0$ and $F_7$, but the output is $F_0-F_7$ since $F_7$ is first negated prior to summing. Multiplication is denoted by a box in the signal line. For the case illustrated in FIG. 9a, the multipliers are $a_1=0.707$, $a_2=0.541$, $a_3=0.707$, $a_4=1.307$, and $a_5=0.383$.

For the flow graph of FIG. 9a, counting the solid circles, there are 29 additions required. There are 13 multiplications required, but since eight of the multiplications are to scale the final output to the correct range, there are only 5 multiplications actually required before quantization, making this a very efficient 1-D DCT.

FIG. 9b is similar in operation to the flow graph described in FIG. 9a. However, FIG. 9b is for a fast Inverse DCT operation.

While the inventive embodiments of FIGS. 7 and 8 illustrate the scaling of data which is received in two-dimensional form, the inventive methods can accomplish similar scaling of data in any number of greater dimensions. In fact, the extension to scaling of any multi-dimensional transformed data can be made. We define multi-dimensional data to be any data set which can be organized as n-dimensional "blocks." The entire image can consist of one block such as for wavelet transformations. For example, a series of image frames viewed at discrete moments in time can be viewed as three-dimensional data. Scaling along any of the three axes is meaningful, i.e. scaling on the first two dimensions results in a change of frame size and scaling along the third dimension results in either speeding up or slowing down the viewing of subsequent frames, depending on whether a scale-down or respectively, a scale up is performed.

Figure 10:
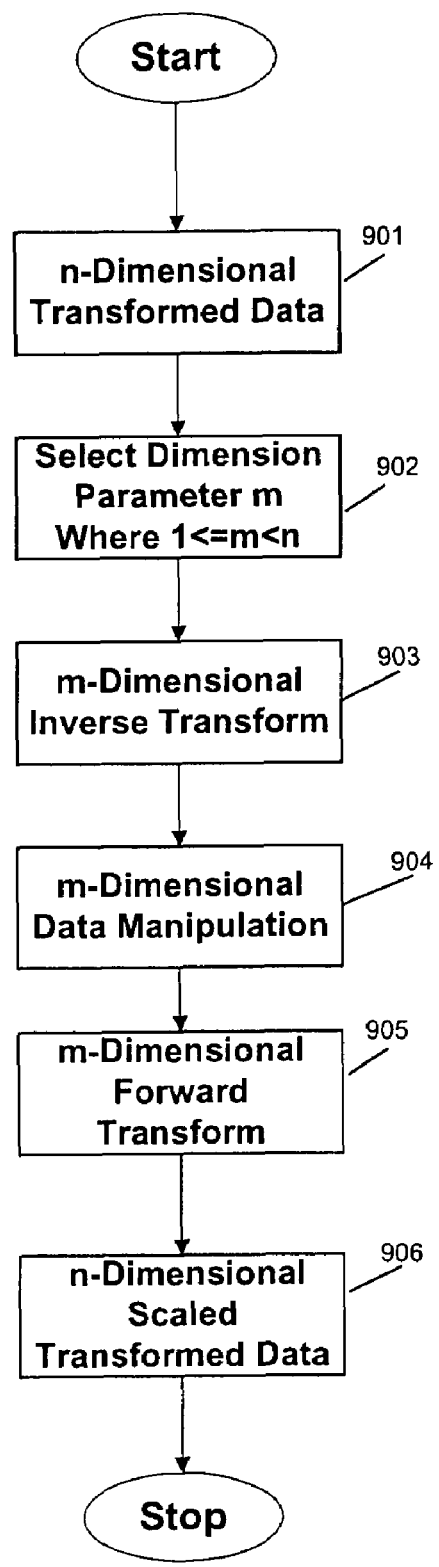
FIG. 10 is a block diagram showing the scaling of data in arbitrary dimensions according to an embodiment of the present invention.

FIG. 10 illustrates the logic for the generalized approach to such scaling. At block 901, n-dimensional transformed data is received, where n is any integer of 2 or greater. Next, the user selects a dimension parameter, m, which is the number of dimensions of the input data which are to be scaled. The dimension parameter, m, can be any integer which is greater than or equal to 1 and which is less than n—the number of dimensions of the input transformed data block. (Block 902) (Otherwise an n dimensional inverse transform would take the data back to a completely untransformed state, and the scaling would require traditional real domain manipulation.)

Inverse transforms are performed on the selected dimensions (Block 903). The resulting data is in the hybrid domain and is next manipulated by using scale-up or scale-down algorithms (Block 904). Next, forward transforms are performed on the scaled hybrid data to produce one or more output blocks of scaled, transformed data in n dimensions (Blocks 905 & 906).

Alternatively, after the m-dimensional manipulation (e.g. scaling) in the hybrid domain (Block 904), the process could continue through an (n–m) dimensional inverse transform to produce scaled data in the real domain. Another embodiment could start with real domain data, perform an (n–m) dimensional forward transform to arrive at block 904. An example of where this would be advantageous is when image data is being scaled up along one axis. By first transforming along one axis, and then scaling up the resulting hybrid data along the other axis, one need only perform the final forward transforms along the second (scaled) axis, since the first axis has already been transformed. This saves a number of forward transforms along the first axis proportional to the scaling factor. The hybrid domain manipulation can also take advantage of the many zeros produced because of strong correlation in the data. The manipulated data can then be m-dimensionally forward transformed (Block 905) to produce the n-dimensional scaled transformed data (Block 906).

Since this hybrid domain lends itself to m-dimensional data manipulation on (n–m) dimensionally transformed data, the hybrid data may be stored temporarily in buffers or on hard disk until later manipulation steps are ready to be performed before returning to the real domain or the n-dimensional transform domain. This is particularly useful when the manipulation is an iterative process such as in image editing or during the composition of new images. Retaining the hybrid data saves the degradation that may come from the re-quantization in the n-dimensional transform domain or the rounding to integers in the real domain.

Figure 11A:
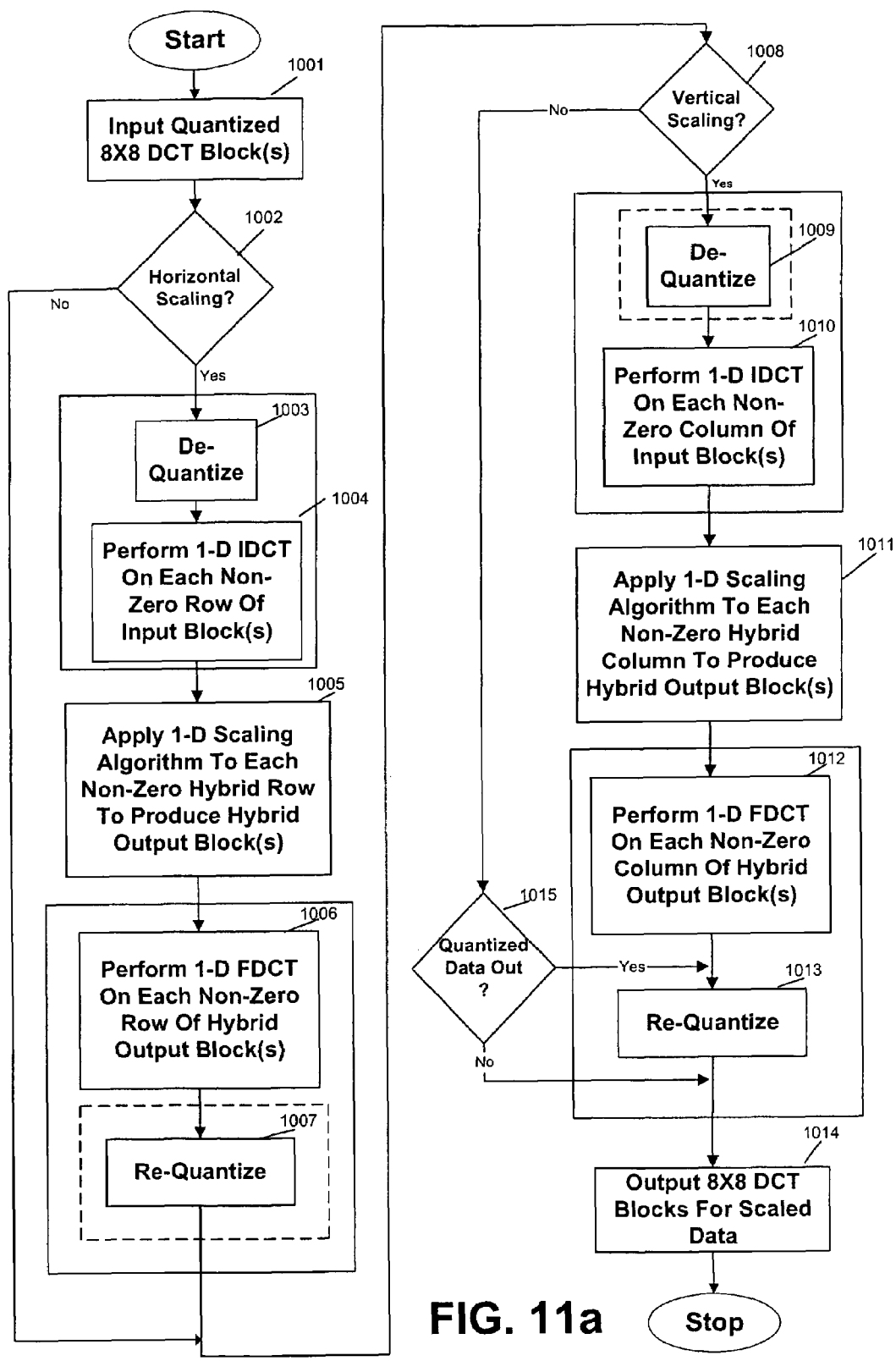
FIGS. 11a and 11b illustrate the logic to scale both dimensions of two-dimensional input transformed data in accordance with an embodiment of the present invention.

FIG. 11a illustrates the steps for scaling the size of a two-dimensional input image in either or both dimensions in accordance with one embodiment of the present invention. The process commences with the receipt of one or more two-dimensional blocks of data from an image file in quantized, DCT format. (Block 1001) A determination is made whether the image is to be scaled on the horizontal axis. (Block 1002) If so, then the input data is de-quantized. (Block 1003) A one-dimensional inverse transform is performed on each "non-zero" row of data, i.e., a row of input data which contains at least one value other than zero within the row. (Block 1004) That is, if a row consists entirely of zeros, then an inverse transform operation is not performed because it is not needed. Rows consisting of coefficients of zeros will transform to rows in the hybrid domain which also consist only of zeros.

With the data now in the hybrid domain, it is manipulated by performing one-dimensional scaling up or scaling down algorithms to each non-zero row of data. (Block 1005) Upon completion of the scaling operation, a one-dimensional forward transform in performed on each non-zero row of hybrid data to return the data to the DCT domain whereupon the data is re-quantized. (Blocks 1006 and 1007) The data is now scaled in the horizontal axis. However, if further data manipulation is desired, such as for example, the scaling of the data in the vertical dimension, then the step of block 1007 need not be completed. Thus this step is optional.

Figure 11B:
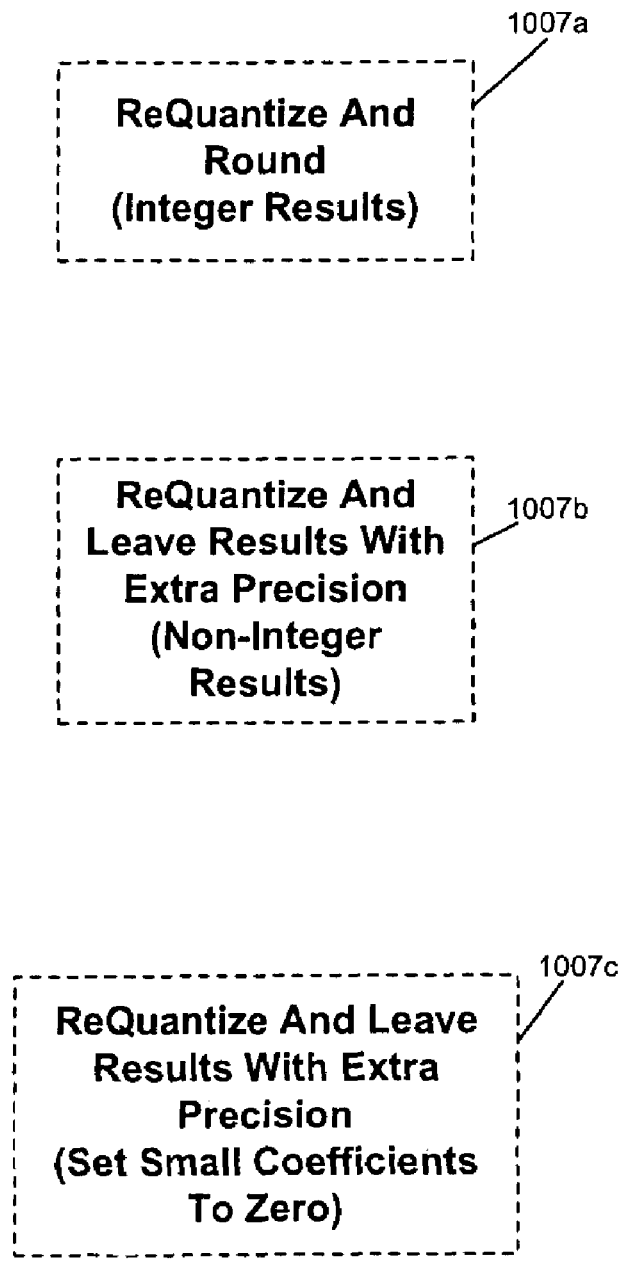

Not only is this re-quantization step optional, but there are several variations which can be employed. FIG. 11b illustrates three variations of the re-quantization step. As has been previously explained, a quantization step typically involves, among other things, the rounding of values to produce integer coefficients (Block 1007a). While some precision is lost by this process, it does produce a more compressed form of data. This rounding option is usually performed when all data processing is completed. However, if more data processing is to be accomplished, then it may be desirable to forego the rounding of values and keep the results of this re-quantization step in non-integer values (Block 1007b). In the case illustrated in FIG. 11a, such a result would be desirable if the data is to be scaled along the vertical axis. Thus the precision of the data is not lost by this re-quantization step.

Returning to FIG. 11b, there may be occasions when it is desirable to apply an intermediate re-quantization step which envisions further data processing, but allows for faster operations than that realized by Block 1007b. This can be achieved by re-quantizing and leaving the results with extra precision (i. e. with non-integer results). However, an additional step is employed whereby those non-integer coefficient values which are sufficiently "small" are set to a value of zero. In another words, those non-integer coefficients having an absolute value which is less than some pre-determined constant are set to zero while the other non-integer coefficients are not changed (Block 1007c). Other criteria may be used to determine what "small" means. The addition of these extra zeros to the data can result in faster follow-up calculations.

Returning to FIG. 11a, block 1002, if on the other hand it was determined that no horizontal scaling was desired, then the steps represented by blocks 1003 through 1007 are bypassed and control would shift to block 1008 where a determination is made whether scaling in the vertical dimension is desired. If not, then control would transfer to block 1015 where a determination is made whether quantized data is to be produced. If so, then a re-quantize step is performed (block 1013) and quantized DCT blocks of scaled data are output from the system (Block 1014). If quantized output data is not desired, then the re-quantization step is by-passed.

Returning to block 1008, if on the other hand it was determined that scaling along the vertical axis is desired, then the data is de-quantized (Block 1009). However this step is optional and can be by-passed if the incoming data has not been quantized. Next, a one-dimensional inverse transform is performed on each non-zero column of input data. (Block 1010)

With the data now in the hybrid domain, it is manipulated by performing one-dimensional scaling up or scaling down algorithms to each non-zero column of data, i.e., a column of data which does not consist entirely of zeros (Block 1011). Upon completion of the scaling operation, a one-dimensional forward transform is performed on each non-zero column of hybrid data to return the data to the DCT domain whereupon the data is re-quantized (Blocks 1012 and 1013). The data is now scaled in the vertical axis. However, if further data manipulation is desired, then the step of block 1013 need not be completed. As before, this step is optional.

FIGS. 11a and 11b illustrate a method of scaling data where the input data is transformed data and the output, scaled data is also transformed data. However, there may arise situations in which scaling along a single axis of two-dimensional data in the real domain is required during conversion to the transform domain. Likewise, it may be desirable to scale data along a single axis during the conversion from transform data to real data. Such scaling can be accomplished by first applying a one-dimensional forward transform (if starting with real data) or a one-dimensional inverse transform (if starting with transform data) to each row (for horizontal scaling) or column (for vertical scaling) of the original incoming block(s), applying the desired scaling algorithm along this axis, and following that with a one dimensional forward or inverse transform (depending on whether the original data was real or transform) along each slice of the complementary axis.

The foregoing description relates to the scaling of data which is in the hybrid domain. For other operations on data which is in the hybrid domain, see application Ser. No. 09/588,477 filed Jun. 7, 2000 (issued as U.S. Pat. No. 6,675,185), by Joan L. Mitchell, Marco Martens, and Timothy J. Trenary, for "Hybrid Domain Processing of Multi-Dimensional Transformed Data" (IBM Docket YOR9-2000-0005) and assigned to a common assignee with this application.

Thus what is disclosed is a method, system and data structure for efficiently scaling data which has been multi-dimensionally transformed from the real domain. n-dimensional transformed data representing some original n-dimensional real data is received. An m-dimensional inverse transform on the n-dimensional transformed data is performed to produce hybrid data, where $1 \leq m < n$. The hybrid data is scaled in p dimensions to produce scaled hybrid data representing a desired p-dimensional change in the n-dimensional real data where $p \leq m$. Finally, an m-dimensional forward transform is performed on the scaled hybrid data to produce n-dimensional scaled transformed data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for the scaling of image data, wherein the method is performed by a computer in association with at least one computer program embedded in a computer readable medium, the method comprising:

receiving, by the computer in association with the at least one computer program embedded in the computer readable medium, n-dimensional real data, wherein the n-dimensional real data is the image data in real domain;

performing, by the computer in association with the at least one computer program embedded in the computer readable medium, an (n−m)-dimensional forward transform on the n-dimensional real data to produce hybrid data, where $1 \leq m < n$; and scaling, by the computer in association with the at least one computer program embedded in the computer readable medium, the hybrid data in p dimensions to produce scaled hybrid data representing a desired p-dimensional change in the n-dimensional real data where $p \leq m$, wherein the image data is scaled as a result of the receiving, the performing, and the scaling being performed.

2. The method of claim 1, further comprising:

performing, by the computer in association with the at least one computer program embedded in the computer readable medium, an m-dimensional forward transform on the scaled hybrid data to generate n-dimensional transformed data.

* * * * *